(12) United States Patent
Kume et al.

(10) Patent No.: US 10,304,452 B2
(45) Date of Patent: May 28, 2019

(54) VOICE INTERACTIVE DEVICE AND UTTERANCE CONTROL METHOD

(71) Applicant: TOYOTA JIDOSHA KABUSHIKI KAISHA, Toyota-shi, Aichi-ken (JP)

(72) Inventors: Satoshi Kume, Chofu (JP); Kota Hatanaka, Kama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/646,238

(22) Filed: Jul. 11, 2017

(65) Prior Publication Data

US 2018/0025727 A1  Jan. 25, 2018

(30) Foreign Application Priority Data

Jul. 19, 2016  (JP) .................................. 2016-141621

(51) Int. Cl.
*G10L 15/22* (2006.01)
*G10L 17/22* (2013.01)

(52) U.S. Cl.
CPC .............. *G10L 15/22* (2013.01); *G10L 17/22* (2013.01); *G10L 2015/223* (2013.01); *Y10S 901/46* (2013.01)

(58) Field of Classification Search
CPC ..................................................... G10L 15/22
USPC ........................................................ 704/275
See application file for complete search history.

(56) References Cited

U.S. PATENT DOCUMENTS

| | | | |
|---|---|---|---|
| 7,012,996 B2 * | 3/2006 | Polcyn .............. | H04M 3/42204 379/211.02 |
| 9,002,705 B2 * | 4/2015 | Yoshida ................. | G10L 15/22 379/88.01 |
| 9,473,635 B2 * | 10/2016 | Weinstein ........... | H04M 3/5175 |
| 9,699,307 B2 * | 7/2017 | Conway ................ | G10L 15/265 |
| 9,799,332 B2 * | 10/2017 | Kim ........................ | G10L 15/22 |

FOREIGN PATENT DOCUMENTS

| | | |
|---|---|---|
| JP | 2006-243555 A | 9/2006 |
| JP | 2007-160473 A | 6/2007 |
| JP | 2008-087140 A | 4/2008 |
| JP | 2015-013351 A | 1/2015 |
| WO | 2005/086051 A1 | 9/2005 |
| WO | 2014/087495 A1 | 6/2014 |

* cited by examiner

*Primary Examiner* — Susan I McFadden
(74) *Attorney, Agent, or Firm* — Oliff PLC

(57) ABSTRACT

A voice interactive device constituting an interaction system in which a plurality of voice interactive devices interact with a user, comprises a voice input unit that acquires voice uttered by a user; an information generating unit that generates user utterance information, the user utterance information being information for specifying a voice interactive device having been spoken to by the user; a transmitting/receiving unit that transmits the generated user utterance information to another voice interactive device and that receives, from the other voice interactive device, user utterance information; a determining unit that determines whether or not a response is to be made to the utterance by the user based on the generated and received user utterance information; and an interacting unit that performs interaction with the user on the basis of a result of the determination.

9 Claims, 7 Drawing Sheets

VOICE INTERACTIVE DEVICE AND UTTERANCE CONTROL METHOD

BACKGROUND OF THE INVENTION

Field of the Invention

The present invention relates to a device which interacts with a person by voice.

Description of the Related Art

In recent years, robots which provide various kinds of information by interacting with a person are being developed. For example, Japanese Patent Application Laid-open No. 2015-013351 discloses a communication robot which processes, over a network, voice input through a microphone and which returns a voice response to the input.

SUMMARY OF THE INVENTION

Since robots which interact by voice as described above are basically designed for one-on-one interaction, a plurality of robots cannot be placed in a user environment. For example, when there are a plurality of robots within hearing distance of a user's voice, since all of the robots respond to a call by the user, the user is unable to start only a conversation with a desired partner.

In order to solve this problem, each robot must appropriately determine to whom the user is speaking and decide whether or not to respond to the user.

The present invention has been made in consideration of the problem described above and an object thereof is to provide a technique for enabling natural interaction between a person and a voice interactive device.

The present invention in its one aspect provides a voice interactive device constituting an interaction system in which a plurality of voice interactive devices interact with a user, the voice interactive device comprising a voice input unit that acquires voice uttered by a user; an information generating unit that generates user utterance information on the basis of on the acquired voice, the user utterance information being information for specifying a voice interactive device having been spoken to by the user among the plurality of voice interactive devices; a transmitting/receiving unit that transmits the generated user utterance information to another voice interactive device and that receives, from the other voice interactive device, user utterance information generated by the voice interactive device; a determining unit that determines whether or not a response is to be made to the utterance by the user on the basis of the generated and received user utterance information; and an interacting unit that performs interaction with the user on the basis of a result of the determination.

An information generating unit generates, based on voice acquired externally, user utterance information which is information for specifying a voice interactive device to which a user has spoken. The user utterance information may represent, but is not limited to, an incoming direction of voice relative to a device (a direction of the user as viewed from the device), a distance between a voice interactive device and the user, or an utterance content of the user.

In addition, a transmitting/receiving unit transmits generated user utterance information to another voice interactive device and receives user utterance information from another voice interactive device. In other words, user utterance information generated by each voice interactive device constituting a system is shared by all voice interactive devices. Furthermore, a determining unit determines, based on collected user utterance information, whether or not a response is to be made to an utterance by the user.

According to the configuration described above, in an interaction system constituted by a plurality of voice interactive devices, a voice interactive device to respond to a user can be uniquely identified and one-on-one interaction between the user and the voice interactive device can be started.

Also, the voice input unit may include a microphone capable of detecting an incoming direction of voice with respect to the voice interactive device, and the information generating unit may generate user utterance information including one of information representing the incoming direction of voice with respect to the voice interactive device and information related to sound pressure of the voice.

The incoming direction of voice to the voice interactive device can be acquired using, for example, a microphone (an array of microphones) having a plurality of voice input elements.

In most cases where a user calls a voice interactive device, the user makes an utterance while facing the voice interactive device. In consideration thereof, a device called by the user can be identified using information related to an incoming direction of voice relative to a voice interactive device or using sound pressure of the voice.

Also, the determining unit may determine that a response is to be made to an utterance of the user when the determining unit determines that the voice interactive device is most directly in front of the user among the plurality of voice interactive devices.

Also, the determining unit may determine that a response is to be made to an utterance of the user when the determining unit determines that the voice interactive device is positioned closest to the user among the plurality of voice interactive devices.

As described above, by making a determination based on an angle or a distance between a voice interactive device and the user, the called voice interactive device can be accurately identified. Moreover, for example, a distance between the voice interactive device and the user can be estimated based on acquired sound pressure.

Also, when the determining unit determines that a response is to be made to an utterance of the user, the interacting unit may continue interaction with the user until a variation amount of the incoming direction or the sound pressure of the voice exceeds a prescribed threshold.

When a voice interactive device to respond to the user is determined each time the user makes an utterance, a slight variation in conditions may cause an interaction partner to change. In consideration thereof, when it is once determined to respond to an utterance of the user, interaction is continued until the incoming direction of the voice or a variation amount of sound pressure exceeds a prescribed threshold. Accordingly, even when a volume of the user's voice temporarily decreases or a direction of the user's face changes, interaction can be continued.

Also, the transmitting/receiving unit may transmit information representing an interaction state between the voice interactive device and the user to another voice interactive device, and the determining unit may determine whether not the interaction between the other voice interactive device and the user is continuing based on the received information, and may suspend the determination whether or not a response is to be made to the utterance by the user, as long as the interaction continues.

When a certain voice interactive device once starts interaction with the user, other voice interactive devices favorably suspend response determination as long as the interaction continues. In consideration thereof, for example, the voice interactive device interacting with the user may be configured to transmit information indicating a start of interaction and information indicating an end of interaction. Moreover, as information representing an interaction state, information to be transmitted may be any of "information representing a start of interaction and an end of interaction", "information representing a start of interaction", and "information representing an end of interaction". Accordingly, unnecessary processing can be reduced.

Also, the voice interactive device may further comprises a user identifying unit that identifies a user having uttered the acquired voice, and the information generating unit may associate an identifier of the user with the user utterance information, and the determining unit may determine whether or not a response is to be made to an utterance of the user for each identified user.

Individual identification of users may be performed based on voices of the users and a determination of whether or not to respond may be made for each identified user. According to the configuration described above, a plurality of users can participate in a conversation with a robot.

Moreover, the present invention can be identified as a voice interactive device or an interaction system which includes at least a part of the units described above. In addition, the present invention can also be identified as an utterance control method carried out by the voice interactive device or the interaction system. The processes and units described above may be implemented in any combination thereof insofar as technical contradictions do not occur.

According to the present invention, natural interaction between a person and a voice interactive device is enabled.

DESCRIPTION OF THE EMBODIMENTS

First Embodiment

Hereinafter, preferred embodiments of the present invention will be described with reference to the drawings.

A voice interaction system according to the present embodiment is a system which is constituted by a plurality of robots and in which the robots interact with a user in a natural language.

<System Configuration>

Figure 1:
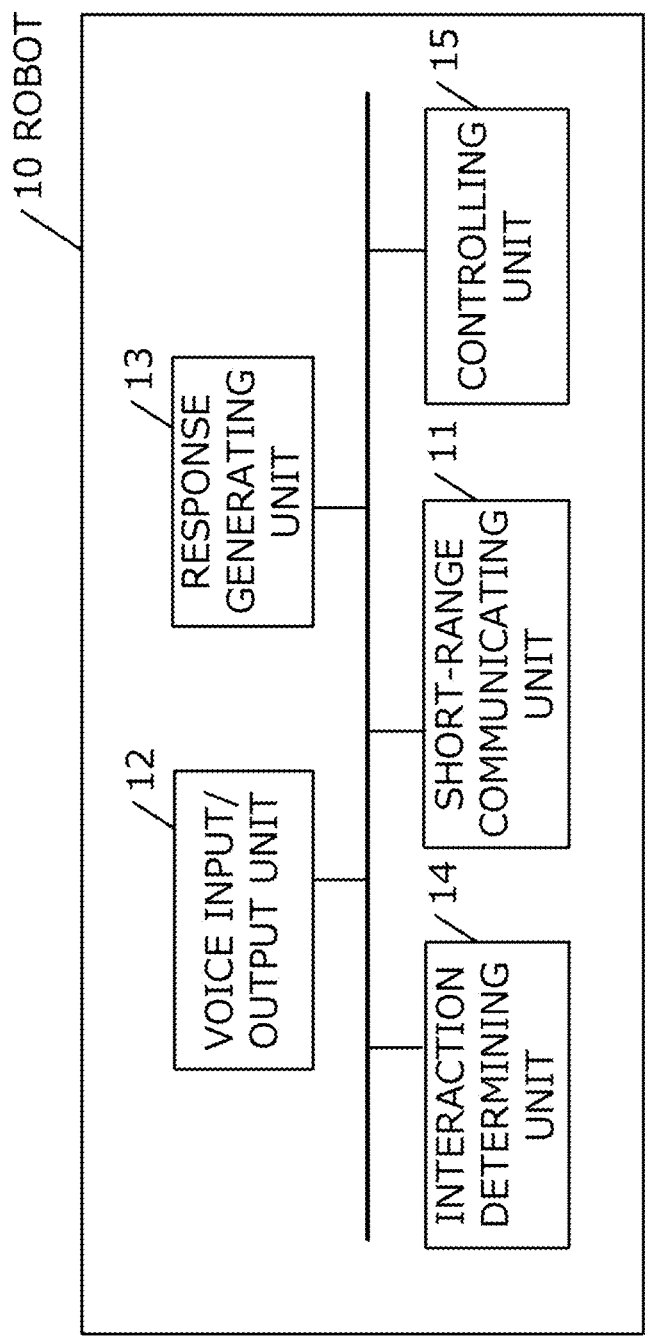
FIG. 1 is a system configuration diagram of a robot according to a first embodiment.

FIG. 1 is a system configuration diagram of a robot 10 according to the present embodiment. Moreover, although not shown in FIG. 1, the voice interaction system according to the present embodiment can be configured so as to include a plurality of robots 10.

The robot 10 has a function for acquiring voice from the outside, a function for acquiring a sentence of an utterance content (hereinafter, a speech sentence), and a function for outputting the speech sentence by voice. While an example of the robot 10 is a communication robot, the robot 10 need not necessarily have a semblance of a character. For example, a general-purpose computer that can be built into a robot may suffice.

In addition, the robot 10 has a function for, when detecting an utterance by a user, communicating with other peripherally-present robots 10, identifying "which robot was spoken to", and causing only the identified robot to respond.

The robot 10 is constituted by a short-range communicating unit 11, a voice input/output unit 12, a response generating unit 13, an interaction determining unit 14, and a controlling unit 15.

The short-range communicating unit 11 is a unit used to communicate in a wireless manner between robots 10. In the first embodiment, the short-range communicating unit 11 communicates using a Bluetooth (registered trademark) connection. In the first embodiment, information exchange among a plurality of robots 10 is realized using the short-range communicating unit 11.

The voice input/output unit 12 is a unit used to input and output voice. Specifically, voice is converted into an electrical signal (hereinafter, voice data) using a built-in microphone. Acquired voice data is output to the response generating unit 13 to be described later. In addition, the voice input/output unit 12 uses a built-in speaker to convert voice data transmitted from the response generating unit 13 into voice.

Figure 2A:
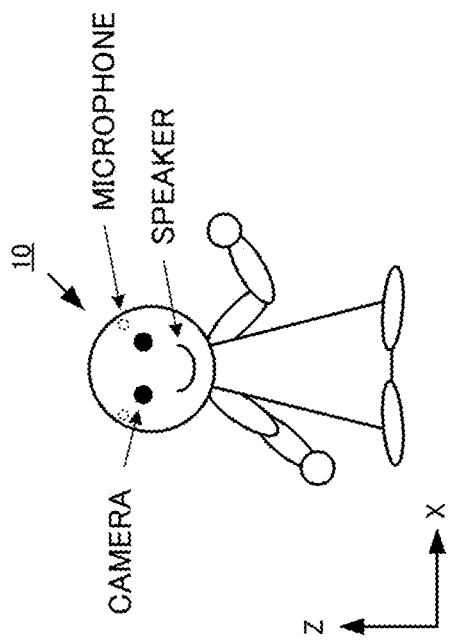
FIGS. 2A and 2B are diagrams illustrating a positional relationship between a robot and a user to be a sound source.
Figure 2B:
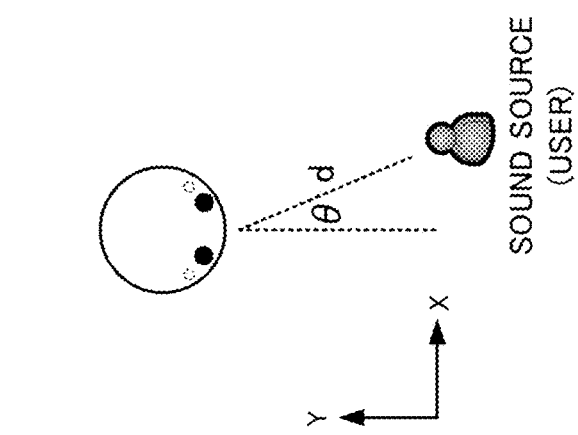

Furthermore, as the microphone, the voice input/output unit 12 has an array of microphones (depicted by dotted lines) such as that shown in FIGS. 2A and 2B. By first recording and then computing signals obtained from the respective microphones, a direction and a distance of a sound source can be calculated. Moreover, the microphones may be arranged two-dimensionally or three-dimensionally. A three-dimensional arrangement enables a position in a height (Z axis) direction to be detected.

The response generating unit 13 is a unit which performs voice recognition on the voice acquired by the voice input/output unit 12 and which generates a response sentence based on a recognition result.

Voice recognition can be performing using existing techniques. For example, voice recognition is performed by comparing acquired voice data with an acoustic model to extract a feature and matching the extracted feature with a recognition dictionary.

In addition, a sentence (a response sentence) as a reply to the user is generated based on an acquired text (in other words, contents of an utterance made by the user). For example, the response generating unit 13 may generate a response based on an interaction scenario (an interaction dictionary) stored in advance.

The response generated by the response generating unit 13 is transmitted in a text format to the controlling unit 15 and subsequently output toward the user by a synthesized voice.

The interaction determining unit 14 is a unit which determines whether or not a user present nearby the unit's own robot is speaking to the robot and which determines whether or not to response to the utterance of the user.

While the robot 10 generates a response sentence based on input voice, inconveniences such as a situation where a plurality of robots simultaneously respond to the user may arise unless response conditions are set. In consideration thereof, the robot 10 according to the present embodiment communicates with other robots present within a communication range and determines only one robot to interact with the user.

Specifically, the interaction determining unit 14: (1) generates, based on voice acquired by the voice input/output unit 12, information representing a positional relationship between the robot and the user; (2) exchanges the information with other peripherally-present robots; and (3) determines, based on the exchanged information, whether or not its own robot is to interact with the user. A specific method will be described later.

The controlling unit 15 is a unit which controls, as a whole, voice interaction performed by the robot 10.

Specifically, the controlling unit 15 executes a function for starting interaction in response to a call made by an interaction partner (a user), a function for acquiring a response sentence based on an utterance by the user, a function for converting the acquired response sentence into voice data and outputting the voice data via the voice input/output unit 12, and the like.

Each robot 10 can be configured as an information processing apparatus including a CPU, a main storage apparatus, and an auxiliary storage apparatus. The respective units illustrated in FIG. 1 function as a result of a program stored in the auxiliary storage apparatus being loaded on the main storage apparatus and executed by the CPU. Alternatively, all of or a part of the illustrated functions may be executed using exclusively designed circuits.

<User Utterance Information>

Next, information (hereinafter, user utterance information) acquired by the interaction determining unit 14 and exchanged among the robots 10 will be described. As shown in FIGS. 2A and 2B, the robot 10 according to the present embodiment has a plurality of microphones and is capable of calculating a relative position of a user in an X-Y plane. Specifically, an angle $\theta$ of the user relative to the robot 10 is calculated based on a time difference in an acquired voice and, at the same time, a distance d between the robot 10 and the user is estimated based on sound pressure. Since methods therefor are well known, a detailed description will be omitted.

Moreover, sound pressure of voice which reaches a robot when the user makes an utterance changes depending on a volume of the voice of the user. Therefore, the interaction determining unit 14 may perform processing on the assumption that the user makes utterances at a constant volume.

User utterance information is information including the angle $\theta$ and the distance d acquired or estimated by a robot. The user utterance information generated by the interaction determining unit 14 is broadcast in a wireless manner via the short-range communicating unit 11. In addition, each robot 10 receives broadcast user utterance information and stores the received user utterance information in the interaction determining unit 14.

Figure 3:
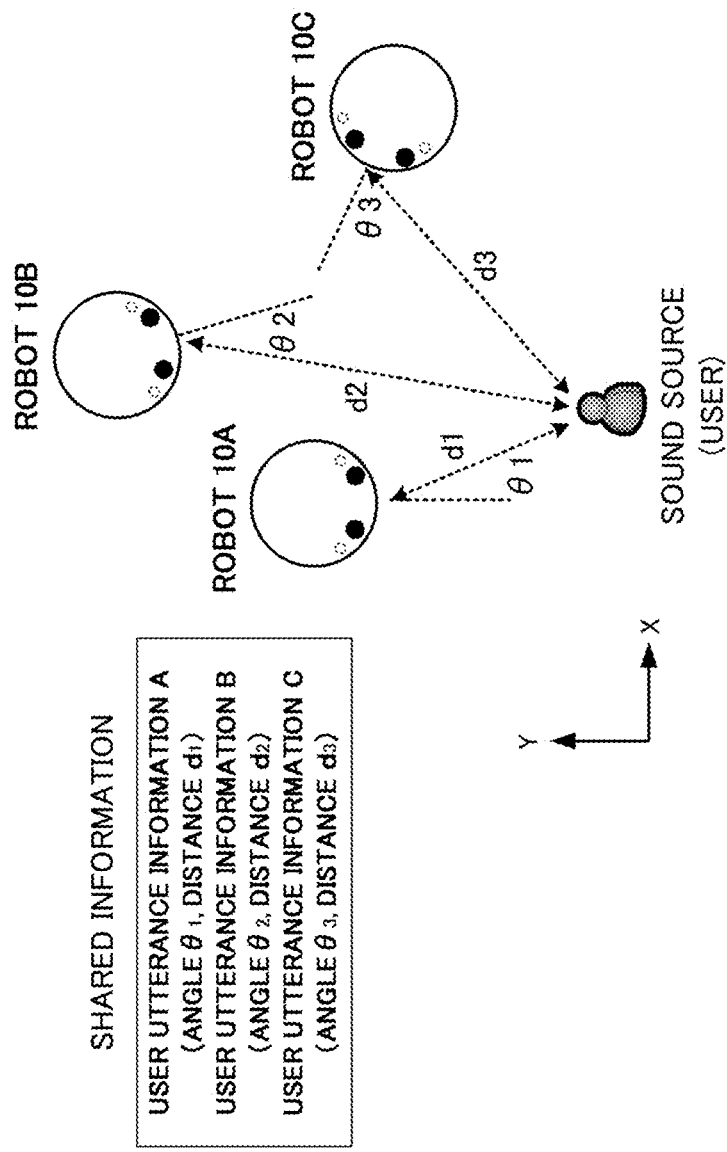
FIG. 3 is a diagram illustrating a positional relationship among a plurality of robots and a user.

FIG. 3 is a diagram representing positional relationships among three robots 10 (A to C) and a user.

<Determination Based on User Utterance Information>

Next, processing for determining a robot to respond to a user based on collected user utterance information will be described. Moreover, the present example will be described by assuming a case where the user speaks to the robot 10A.

When the user makes an utterance to a robot, each of the robots 10A to 10C calculates the angle $\theta$ and the distance d according to the method described above. In this case, let us assume that the robot 10A has calculated an angle $\theta_1$ and a distance $d_1$, the robot 10B has calculated an angle $\theta_2$ and a distance $d_2$, and the robot 10C has calculated an angle $\theta_3$ and a distance $d_3$. The user utterance information generated by each robot is transmitted by broadcast and shared by all robots. In this case, pieces of user utterance information A to C are shared by the robots 10A to 10C as shown in FIG. 3.

Next, the interaction determining unit 14 determines, based on the collected user utterance information, whether or not to respond to an utterance by the user. For example, a score is calculated by normalizing and then performing a weighted addition of the angle $\theta$ and the distance d, and a robot with a highest score is determined as the robot to respond to an utterance of the user. Hereinafter, the robot determined to respond to an utterance of the user will be described as a robot having obtained a right of utterance. When the interaction determining unit 14 determines that its own robot has obtained the right of utterance, the interaction determining unit 14 transmits information to that effect to the controlling unit 15 and the controlling unit 15 performs control for starting interaction with the user. In addition, when it is determined that another robot has obtained the right of utterance, a return is made to a standby state.

<Processing Flow Chart>

Figure 4:
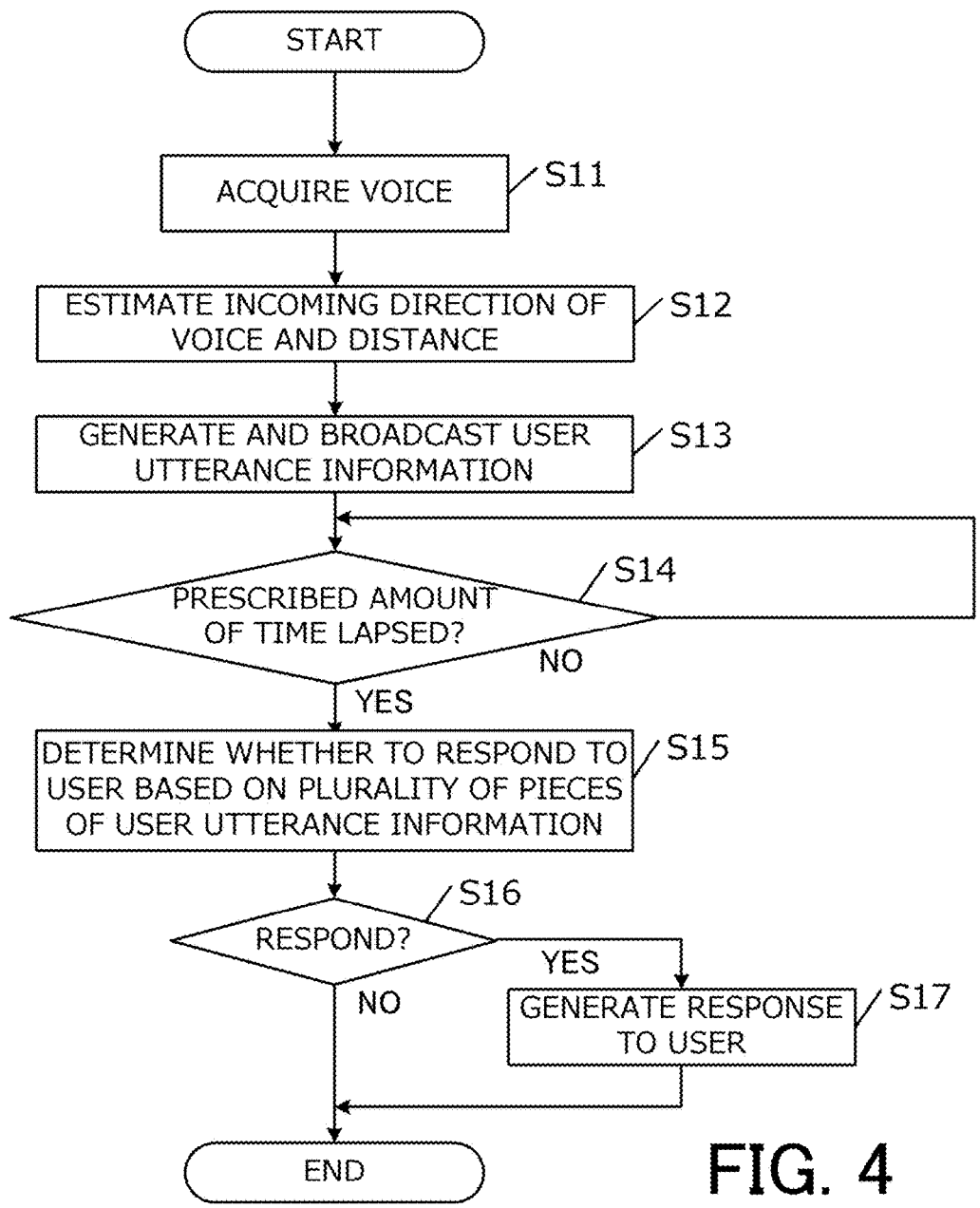
FIG. 4 is a processing flow chart of a robot according to the first embodiment.

Next, specific contents of processing performed by the robot 10 will be described with reference to FIG. 4 showing a processing flow chart. The flow chart shown in FIG. 4 is started upon detection by the robot 10 of voice uttered by the user.

First, in step S11, the voice input/output unit 12 acquires voice from a user of a device through a microphone. The acquired voice is converted into voice data and transmitted to the interaction determining unit 14 and the controlling unit 15.

Next, based on the acquired voice data, the interaction determining unit 14 determines an incoming direction of the voice and a distance from the user (step S12). In addition, user utterance information is generated based on the obtained direction and distance and transmitted by broadcast via the short-range communicating unit 11 (step S13).

In step S14, a determination is made on whether or not a prescribed amount of time has lapsed from voice input and, if not, the interaction determining unit 14 stands by. In addition, when user utterance information is received from other robots during steps S11 to S14, the user utterance information is temporarily stored.

In step S14, when the prescribed amount of time has lapsed, based on a plurality of pieces of stored user utterance information, the interaction determining unit 14 determines whether or not its own robot is to respond to the user according to the method described earlier (step S15).

As a result, when it is determined that a response is to be made (step S16: Yes), the interaction determining unit 14 notifies the controlling unit 15 that a response is to be made. In addition, the controlling unit 15 transmits voice data to the response generating unit 13. The response generating unit 13 executes voice recognition on the transmitted voice data and subsequently generates a speech sentence based on a text of a recognition result (step S17).

The generated speech sentence is transmitted to the controlling unit 15, and the controlling unit 15 performs voice synthesis based on the speech sentence and outputs the synthesized voice via the voice input/output unit 12.

When it is determined in step S16 that a response is not to be made, the processing ends and a return is made to a standby state.

As described above, in the first embodiment, a robot having received an utterance by a user generates user utterance information based on a direction from which voice has arrived and sound pressure of the voice, and exchanges the user utterance information. In addition, each robot determines, based on collected user utterance information, whether or not to respond to the user. According to the configuration described above, even when a plurality of robots are present in an environment, since only one robot to respond to a user can be determined, highly accurate interaction can be performed.

Second Embodiment

In the first embodiment, every time the user makes an utterance to robots, a robot to respond to a user is determined. However, when a robot to interact with the user is determined each time the user makes an utterance, there is a risk that even a slight variation in conditions may cause an interaction partner to change. In the second embodiment, in order to accommodate such situations, a robot retains the right of utterance once acquired by the robot until a trigger occurs.

Since a system configuration diagram of the robot 10 according to the second embodiment is similar to that of the first embodiment, a detailed description will be omitted and only differences will be described.

Figure 5:
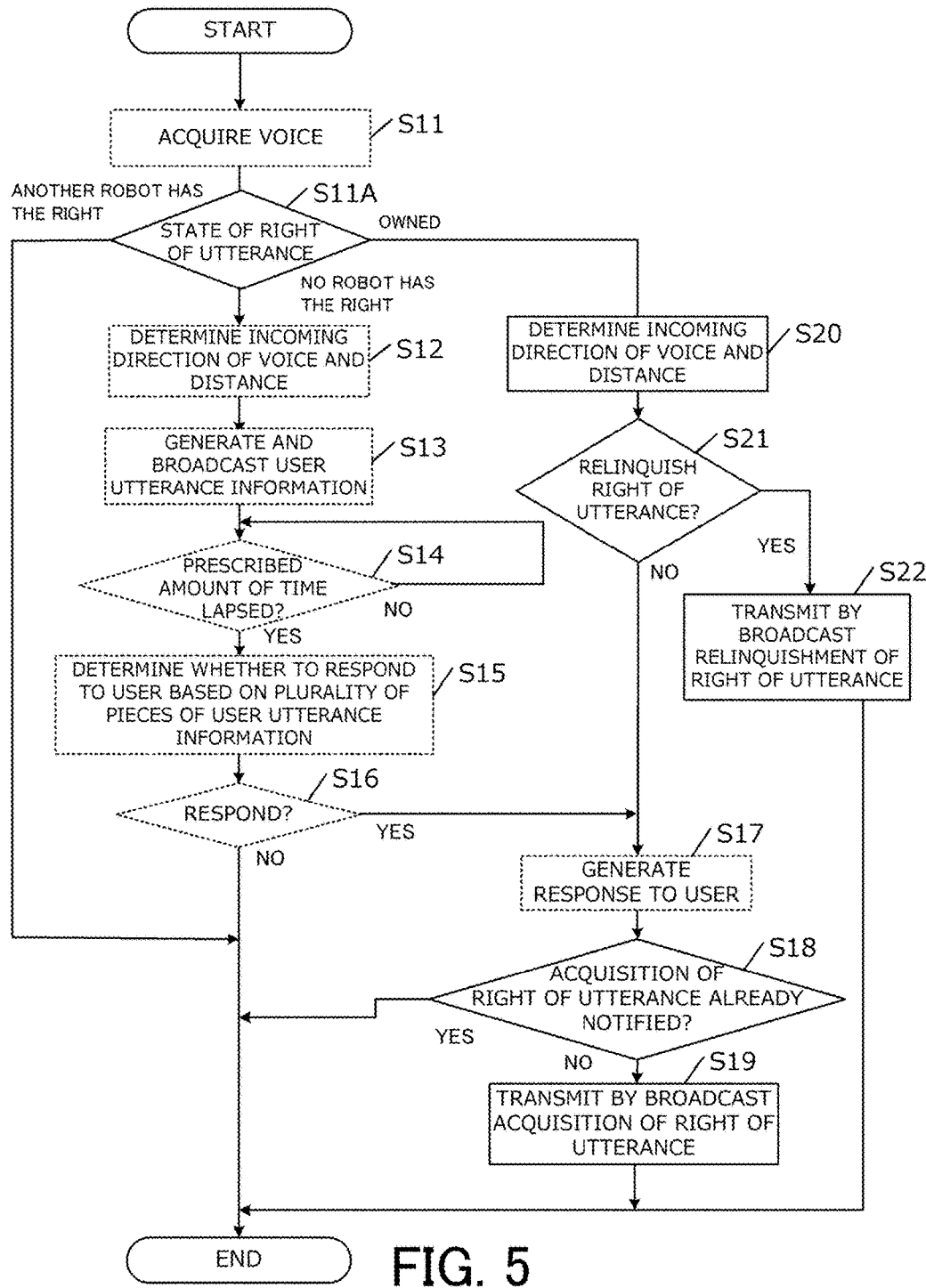
FIG. 5 is a processing flow chart of a robot according to a second embodiment.

FIG. 5 is a processing flow chart of the robot 10 according to the second embodiment. First, processing performed after step S17 will be described.

In the second embodiment, after the robot 10 acquires the right of utterance and generates a response to a user, the robot 10 determines whether or not the acquisition of the right of utterance has been notified to other robots (step S18). At this point, when the notification is yet to be performed, the acquisition of the right of utterance is notified by broadcast transmission to peripherally-present robots (step S19). When the notification has been made, the processing ends. In addition, the other robots having received the notification temporarily store the fact that there is another robot having acquired the right of utterance.

Meanwhile, in the second embodiment, when the robot 10 acquires voice uttered by the user, a state of the right of utterance is determined (step S11A). In the present step, based on stored information, any of "the robot 10 itself has the right of utterance", "another robot has the right of utterance", and "none of the robots have the right of utterance" is determined.

As a result of making the determination in step S11A, when another robot has the right of utterance, the processing is ended as it is. In other words, no further participation in the interaction is made.

On the other hand, when none of the robots have the right of utterance, a transition is made to step S12 to execute processing for determining a robot to respond in a similar manner to the first embodiment.

In addition, when the robot 10 of the interaction determining unit 14 has the right of utterance, in step S20, based on acquired voice data, the interaction determining unit 14 determines an incoming direction of the voice and a distance from the user.

Furthermore, the interaction determining unit 14 determines whether or not the obtained direction and distance have changed significantly from the previously-acquired direction and distance and, if so, the interaction determining unit 14 determines that the user is not making an utterance toward its own robot and determines to relinquish the right of utterance (step S21). For example, the right of utterance is relinquished when any of the direction and the distance has changed in excess of a prescribed threshold or when a score obtained from the direction and the distance has changed in excess of a prescribed threshold.

Moreover, the threshold set at this point favorably represents a condition more lenient than the condition for making a positive determination in step S16 or, in other words, a value which permits a certain degree of variations in the direction and distance. Accordingly, even when a volume of the user's voice decreases temporarily or a direction of the user's face changes temporarily, interaction can be continued.

When it is determined that the right of utterance is to be relinquished, in step S22, information indicating the fact that the right of utterance is to be relinquished is transmitted by broadcast. In addition, a robot having received the information stores information indicating that none of the robots have the right of utterance.

When it is determined in step S21 that the right of utterance is to be maintained, a transition is made to step S17 and a response to the user is generated. In other words, the interaction is continued.

As described above, according to the second embodiment, a robot having once acquired the right of utterance retains the right of utterance and other robots suspend responses unless conditions change significantly. According to the configuration described above, occurrences of a situation where, during an interaction between a user and a robot, another robot reacts and causes the interaction partner to change can be avoided.

Third Embodiment

The first and second embodiments describe examples where a single user interacts with robots. In contrast, in a third embodiment, a plurality of users interact with robots.

Figure 6:
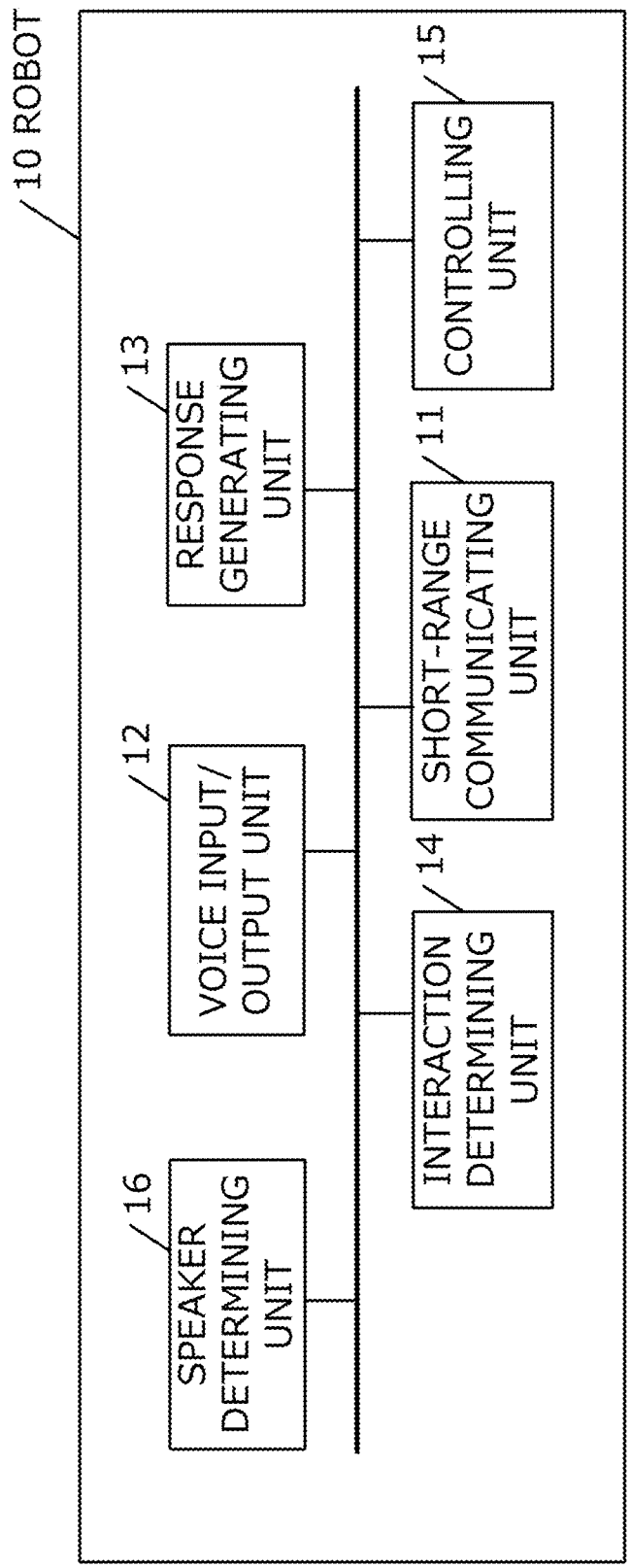
FIG. 6 is a system configuration diagram of a robot according to a third embodiment.

FIG. 6 is a system configuration diagram of the robot 10 according to the third embodiment. Components similar to those of the first embodiment will be denoted by the same reference numerals and a description thereof will be omitted.

A speaker determining unit 16 is a unit which identifies, based on voice acquired by the voice input/output unit 12, a user having uttered the voice. Individual identification of a user can be performed based on, for example, a feature amount acquired from the voice. To this end, the speaker determining unit 16 stores, in advance, information related to a voice of a user in association with an identifier of the user.

In the third embodiment, when the voice input/output unit 12 acquires voice in step S11, the speaker determining unit 16 identifies a user having uttered the voice. In addition, the speaker determining unit 16 associates the identifier of the user with the acquired voice. Furthermore, processing of step S12 and thereafter is performed for each identified user.

For example, when a user A and a user B sequentially make utterances, the robot 10 determines whether or not to respond to each user. For example, when the interaction determining unit 14 determines "not to respond to user A" but "to respond to user B", the robot 10 generates a response sentence targeting only the user B.

In addition, in a similar manner to the second embodiment, information related to the right of utterance may be notified to other robots. In this case, the right of utterance is managed for each user. In other words, "a user targeted by the acquired/relinquished right of utterance" may be notified in steps S19 and S22 and other robots may determine availability of the right of utterance for each user.

Moreover, while information related to the voice of a user is stored in advance in the speaker determining unit 16 in the present embodiment, the functions described above can be realized without using this information. For example, whether a user is a known user or a new user may be determined in each case based on a result of voice analysis and, when it is determined that a new user has joined, an identifier of the user may be added in each case.

(Modifications)

The embodiments described above merely represent examples and the present invention can be implemented with various modifications without departing from the spirit and scope of the invention.

Figure 7:
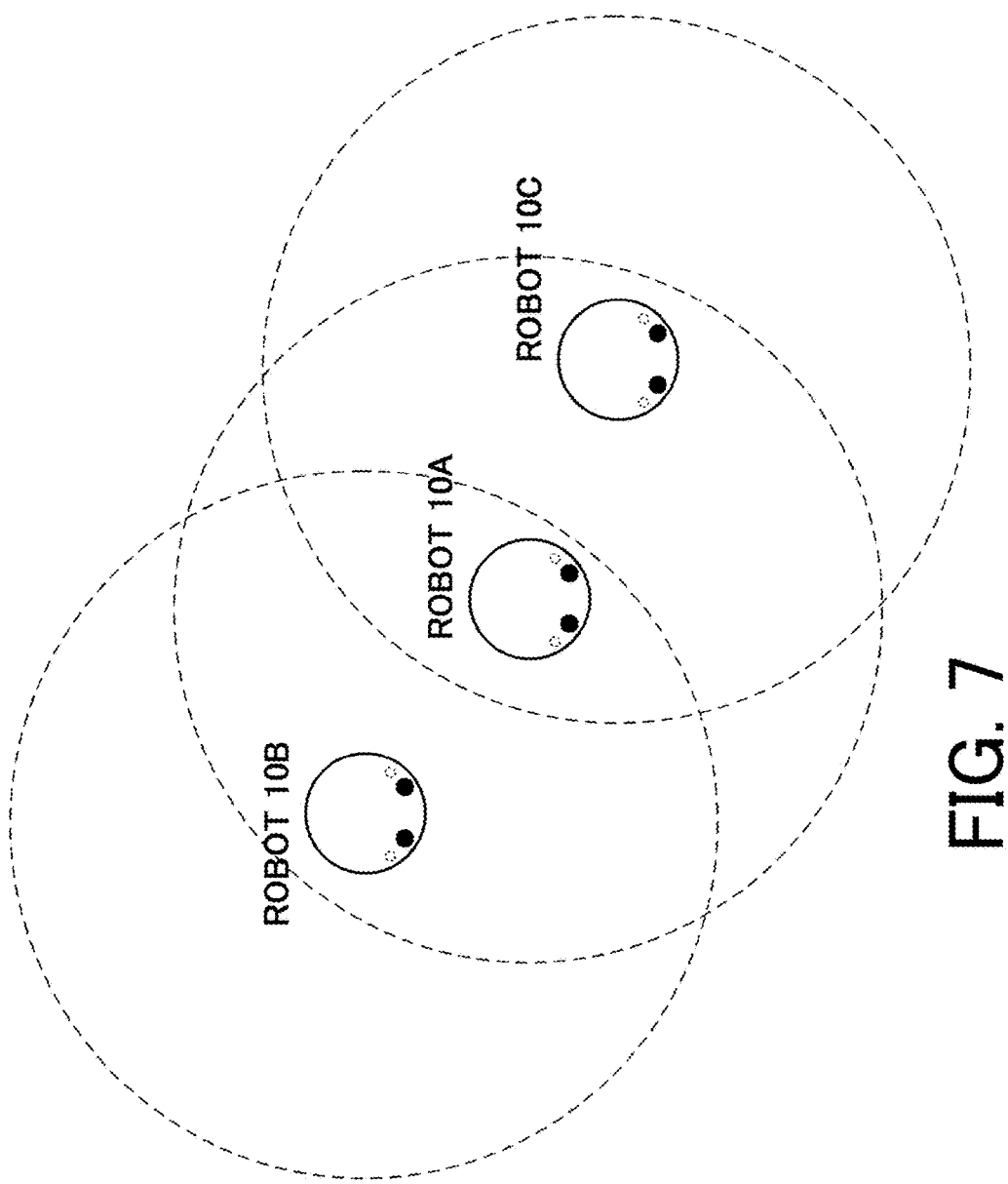
FIG. 7 is a diagram illustrating a modification.

For example, while the respective robots share user utterance information by broadcast transmission in the description of the embodiments given above, when there are robots outside of each other's communication range such as in the case of the robot 10B and the robot 10C shown in FIG. 7, the robots may not be able to recognize each other's presence. In order to prevent such situations from occurring, when user utterance information is received from another robot, the receiving robot may retransmit the received information together with user utterance information generated by the robot itself. However, since repetitively performing such retransmissions may result in congestion of a communication path, transmissions may be terminated at a prescribed time.

In addition, while information indicating acquisition of the right of utterance is transmitted in the second embodiment, the transmission of this information may be omitted. For example, when a robot makes a negative determination in step S16, processing may be performed on the assumption that "the robot does not have the right of utterance" until a notification indicating relinquishment of the right of utterance is transmitted from another robot.

Furthermore, while information indicating relinquishment of the right of utterance is transmitted in the second embodiment, the transmission of this information may be omitted. For example, when a certain amount of time lapses from the acquisition of the right of utterance by a certain robot, each robot may perform processing on the assumption that the right of utterance has been relinquished. Alternatively, the relinquishment of the right of utterance may be detected based on other information. It is needless to say that transmission of both pieces of information can also be omitted.

In addition, while a determination of the right of utterance is made based on a direction and a distance in the description of the embodiments, the determination may be made using other criteria. For example, a robot having the right of utterance may be determined based on contents of an utterance made by a user. For example, when the robot 10A recognizes that the user has called the robot 10A, the robot 10A may notify peripherally-present robots of information indicating that "the robot 10A has been called".

In addition, when the robot 10A determines that the user has called the robot 10B, the robot 10A may notify peripherally-present robots of information indicating that "the robot 10B has been called". Accordingly, even when the robot 10B fails to directly comprehend the call, the robot 10B can recognize that the robot 10B itself has been called.

Furthermore, while a distance from a user is estimated based on sound pressure of acquired voice in the description of the embodiments, processing may be performed using the sound pressure itself without converting the sound pressure into distance.

What is claimed is:

1. A voice interactive device provided in an interaction system in which a plurality of voice interactive devices interact with a user, the voice interactive device comprising:
a microphone configured to acquire a voice uttered by a user;
a processor configured to:
generate user utterance information on the basis of on the acquired voice, the user utterance information being information for specifying a voice interactive device having been spoken to by the user among the plurality of voice interactive devices;
transmit the generated user utterance information to another voice interactive device and that receives, from the other voice interactive device, user utterance information generated by the voice interactive device;
determine whether or not a response is to be made to the utterance by the user on the basis of the generated and received user utterance information; and
interact with the user by responding to the user on the basis of a result of the determination.

2. The voice interactive device according to claim 1, wherein
the microphone is configured to detect an incoming direction of voice with respect to the voice interactive device, and
the processor is configured to generate user utterance information including one of information representing the incoming direction of voice with respect to the voice interactive device and information related to sound pressure of the voice.

3. The voice interactive device according to claim 2, wherein
the processor is configured to determine that a response is to be made to an utterance of the user when the processor determines that the voice interactive device is most directly in front of the user among the plurality of voice interactive devices.

4. The voice interactive device according to claim 2, wherein
the processor is configured to determine that a response is to be made to an utterance of the user when the processor determines that the voice interactive device is positioned closest to the user among the plurality of voice interactive devices.

5. The voice interactive device according to claim 2, wherein
when the processor determines that a response is to be made to an utterance of the user,
the processor is configured to continue interacting with the user until a variation amount of the incoming direction or the sound pressure of the voice exceeds a prescribed threshold.

6. The voice interactive device according to claim 5, wherein
the processor is configured to:
transmit information representing an interaction state between the voice interactive device and the user to another voice interactive device, and
determine whether not the interaction between the other voice interactive device and the user is continuing based on the received information, and suspends the determination whether or not a response is to be made to the utterance by the user, as long as the interaction continues.

7. The voice interactive device according to claim 1, wherein the processor is configured to:
    identify a user having uttered the acquired voice;
    associate an identifier of the user with the user utterance information, and
    determine whether or not a response is to be made to an utterance of the user for each identified user.

8. An utterance control method performed by a voice interactive device constituting an interaction system in which a plurality of voice interactive devices interact with a user,
    the utterance control method comprising:
        acquiring voice uttered by the user;
        generating user utterance information on the basis of the acquired voice, the user utterance information being information for specifying a voice interactive device having been spoken to by the user among the plurality of voice interactive devices;
        transmitting the generated user utterance information to another voice interactive device and receiving, from the other voice interactive device, user utterance information generated by the voice interactive device;
        determining whether or not a response is to be made to an utterance by the user on the basis of the generated and received user utterance information; and
        performing interaction with the user on the basis of a result of the determination.

9. A non-transitory computer readable storing medium recording a computer program for causing a computer to perform the utterance control method according to claim 8.

* * * * *